United States Patent
Albasheir

(10) Patent No.: US 11,985,174 B2
(45) Date of Patent: May 14, 2024

(54) SYSTEMS AND METHODS FOR CALL SESSION CONTROL FUNCTION REGISTRATION

(71) Applicant: T-Mobile USA, Inc., Bellevue, WA (US)

(72) Inventor: Suliman Albasheir, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 72 days.

(21) Appl. No.: 17/136,671

(22) Filed: Dec. 29, 2020

(65) Prior Publication Data

US 2022/0210206 A1  Jun. 30, 2022

(51) Int. Cl.

| | |
|---|---|
| *H04L 65/1073* | (2022.01) |
| *H04L 65/1016* | (2022.01) |
| *H04L 65/1045* | (2022.01) |
| *H04L 65/1069* | (2022.01) |
| *H04L 65/1104* | (2022.01) |
| *H04W 4/60* | (2018.01) |
| *H04W 48/18* | (2009.01) |

(52) U.S. Cl.
CPC ...... *H04L 65/1073* (2013.01); *H04L 65/1016* (2013.01); *H04L 65/1045* (2022.05); *H04L 65/1069* (2013.01); *H04L 65/1104* (2022.05); *H04W 4/60* (2018.02); *H04W 48/18* (2013.01)

(58) Field of Classification Search
CPC ............. H04L 65/1073; H04L 65/1006; H04L 65/1016; H04L 65/105; H04L 65/1069; H04W 4/60; H04W 48/18
See application file for complete search history.

(56) References Cited

U.S. PATENT DOCUMENTS

| | | | | |
|---|---|---|---|---|
| 2011/0134843 A1* | 6/2011 | Noldus | ............... | H04L 65/1073 370/328 |
| 2012/0042084 A1* | 2/2012 | Dutta | .................. | H04L 65/1069 709/228 |
| 2019/0261449 A1* | 8/2019 | Kim | ..................... | H04W 64/003 |
| 2020/0120146 A1* | 4/2020 | Christopher | ........ | H04L 65/1063 |

(Continued)

FOREIGN PATENT DOCUMENTS

WO    WO2019150324 A1    8/2019

OTHER PUBLICATIONS

3GPP, "Technical Specification Group Core Network and Terminals", 5G System—Phase 1; CT WG4 Aspects (Release 16) vol. CT WG4, No. V16.0.0, Jul. 10, 2020, pp. 1-146.

(Continued)

*Primary Examiner* — Khaled M Kassim
(74) *Attorney, Agent, or Firm* — Lee & Hayes P.C.

(57) ABSTRACT

Systems and methods for registering and selecting a Proxy-Call Session Control Function (P-CSCF) are described herein. The systems and methods described herein use a Network Repository Function (NRF) to receive status updates of P-CSCFs available to be selected. The status updates include information such as, but not limited to, whether or not the P-CSCF is active or above or below a predetermined loading threshold. The NRF provides the information to a Session Management Function (SMF) that selects which P-CSCF is to be utilized for a Session Initiation Protocol. The SMF can also use loading levels of the P-CSCFs to perform load balancing.

20 Claims, 5 Drawing Sheets

(56) References Cited

U.S. PATENT DOCUMENTS

2020/0178336 A1* 6/2020 Li .......................... H04L 65/105
2021/0044628 A1* 2/2021 Foti ..................... H04L 65/1046
2021/0099497 A1* 4/2021 Badar ................... H04L 65/105

OTHER PUBLICATIONS

Extended European Search Report dated Apr. 29, 2022 for European Patent Application No. 21210531.6, 10 pages.

* cited by examiner

SYSTEMS AND METHODS FOR CALL SESSION CONTROL FUNCTION REGISTRATION

BACKGROUND

When making a voice/video call in some network types, such as a 5G system, the Session Management Function (SMF) of the 5G system will send to the User Equipment (UE) the Internet Protocol (IP) address of the Proxy-Call Session Control Function (P-CSCF) to allow the UE to find the P-CSCF to make the voice/video call. The P-CSCF of the 5G network facilitates the Session Initiation Protocol (SIP) so that the UE can connect with another UE through the network. An issue is that if the P-CSCF is down or overloaded for any reason, the SMF may not know that, but will still send the IP address of the P-CSCF to the UE. Since the P-CSCF may be overloaded or non-functional, the UE will not be able to instantiate a SIP communication and the call will be dropped. Further, as mentioned above, the SMF will not know how loaded the P-CSCF is, and therefore, cannot load balance between various P-CSCFs. Considering that P-CSCFs are often assigned based on location or other default provision, it is not unlikely that the SMF may continue to attempt to load a particular P-CSCF even though other P-CSCFs may be available. This can lead to inefficiencies in a network.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
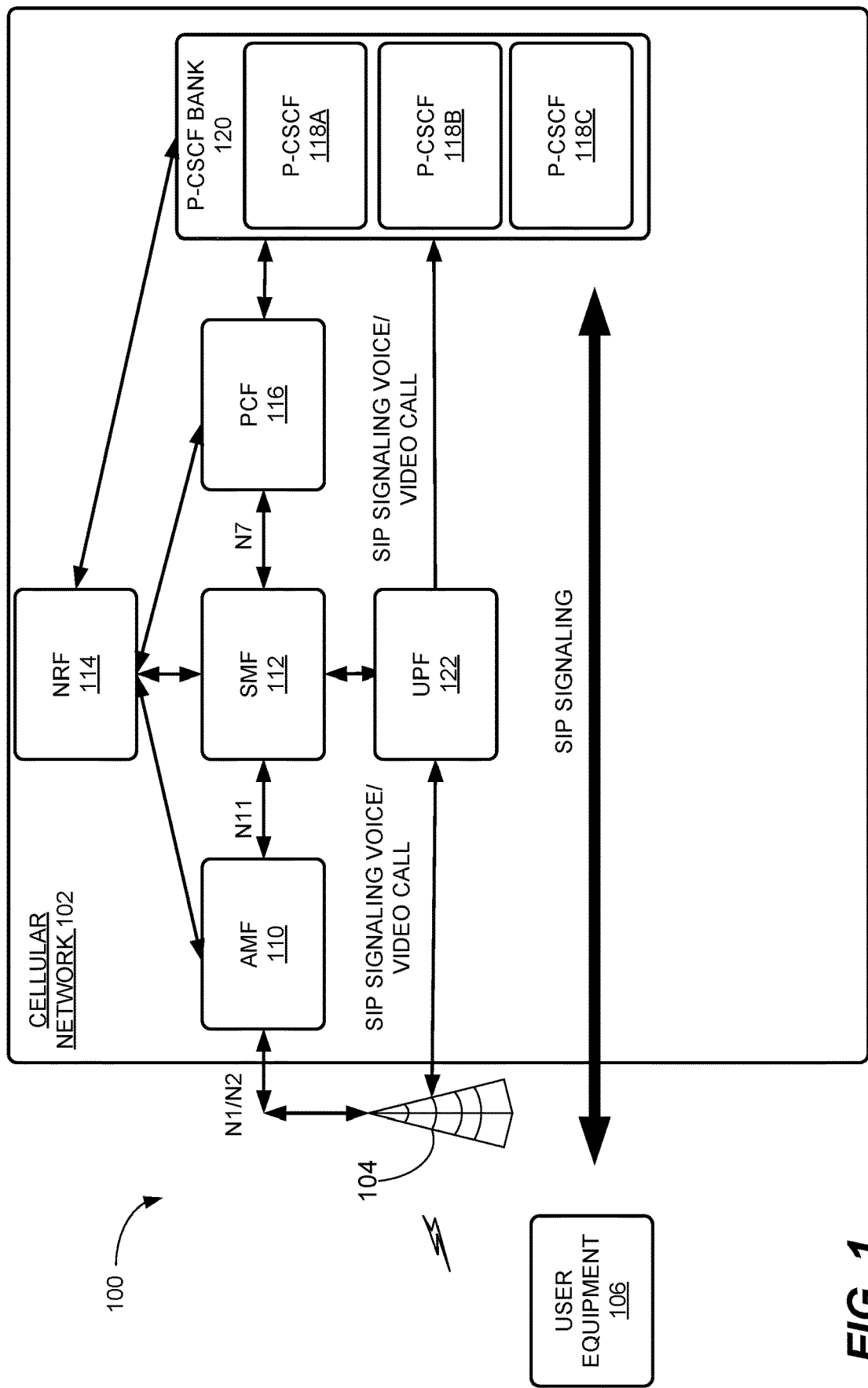
FIG. 1 illustrates an example environment for call session control function discovery, in accordance with some examples of the present disclosure.

Examples of the present disclosure can comprise systems and methods for call session control function discovery, registration, and selection. In some examples of the presently disclosed subject matter, a network repository function (NRF) of a network is configured to receive a registration of a Proxy-Call Session Control Function (P-CSCF). The NRF maintains a list of available P-CSCFs in various regions. When a user equipment (UE) requests to initiate a Session Initiation Protocol (SIP) to establish a voice/video call, a session management function (SMF) of the network in the region of the UE will receive from the NRF an identification of one or more P-CSCFs available in the region. In some examples, the NRF will also transmit loading information about the one or more P-CSCFs provided to the SMF. The SMF will perform the subscribe function for the selected P-CSCF. If the P-CSCF is functional, the SMF will transmit to the selected P-CSCF the appropriate Internet Protocol (IP) address necessary to allow the UE to establish the voice/video call.

In some examples, more than one P-CSCF may register with the NRF. When the UE initiates an SIP signaling to establish a voice/video call, the NRF may access a datastore having usage (loading) levels of the registered P-CSCF. After receiving the information from the NRF, the SMF may determine which P-CSCF should be selected for use based on the usage level. In some examples, other components or functions may determine which P-CSCF to select, such as the NRF. This process may be used to load balance a system of P-CSCFs. The identity of the selected P-CSCF may be transmitted to the UE. In some examples, the P-CSCFs may be configured to automatically update the NRF with load statuses. In other examples, the NRF, or another network component, may be configured to periodically query the P-CSCFs for their load status.

In some examples, the load status may be used as a check against the registration status with the NRF. For example, a registered P-CSCF may upload a load status with the NRF. The NRF may use this information to determine the availability of the P-CSCF. For example, a registered P-CSCF may upload a 100% load status, or a load status above a predetermined load status, meaning the P-CSCF is likely completely utilized and may not be the best candidate to be used for an additional SIP signaling operation. In another example, a P-CSCF may upload a 0% load status, or a load status below a predetermined load status. In this example, the NRF or SMF, or another function of a network, may determine that there may be an error with the load status or the P-CSCF, as having a 0% loading may be unlikely. Thus, even though the P-CSCF may indicate availability, the SMF may not select the P-CSCF until its load status is verified. For example, the NRF may query the P-CSCF to determine the length of time the P-CSCF was either initialized for operation or had a 0% load status. If the P-CSCF was recently initialized, the 0% load status may be correct. However, if the P-CSCF has had a 0% load status for a significant period of time, there may be issues with either determining the loading of the P-CSCF or the P-CSCF itself.

FIG. 1 illustrates an example environment 100 for a call session control function discovery, in accordance with some examples of the present disclosure. The environment 100 includes a cellular network 102. In general, the cellular network 102 can be implemented as a variety of technologies to provide wired and/or wireless access to a network, as discussed herein. In some instances, the cellular network 102 can include a 3GPP Radio Access Network (RAN), such a GSM/EDGE RAN (GERAN), a Universal Terrestrial RAN (UTRAN), a New Radio (for 5G), or an evolved UTRAN (E-UTRAN), or alternatively, a "non-3GPP" RAN, such as a Wi-Fi RAN, or another type of wireless local area network (WLAN) that is based on the IEEE 802.11 standards. Further, the cellular network 102 can include any number and type of transceivers and/or base stations 104 representing any number and type of macrocells, microcells, picocells, or femtocells, for example, with any type or amount of overlapping coverage or mutually exclusive coverage. Only for the purposes of providing a non-limiting example, the subject matter herein is described in terms of use in a 5G network, though the various technologies described herein may be implemented in other types of networks and are considered to be within the scope of the presently disclosed subject matter.

Further included in the example environment 100 is user equipment (UE) 106. The UE 106 can receive and transmit information to the cellular network 102. Examples of the UE 106 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the user equipment 106 include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network, such as the cellular network 102 or another network.

The cellular network 102 includes an Access Mobility Management Function (AMF) 110 and a Session Management Function (SMF) 112. The AMF 110 receives a request from the UE 106 over an N1/N2 connection with the base station 104 to initiate a new session between the UE 106 and a target UE (not illustrated). The AMF 110 forwards session management requirements over an N11 connection to the SMF 112. In some examples, the AMF 110 can determine which SMF 112 to use. The AMF 110 can access a Network Repository Function (NRF) 114 to receive information about which SMF 112 to use. Over an N7 connection, the SMF 112 retrieves policy and subscription information, using information provided by the NRF 114, from a Policy Control Function (PCF) 116.

When a voice/video call is placed by the UE 106, the SMF 112 sends back to the UE 106 an Internet Protocol (IP) address of one of a selected Proxy-Call Session Control Function (P-CSCF) 118A, 118B, and 118C (hereinafter generically referred to as "the selected P-CSCF 118" and individually as "the P-CSCF 118A," "the P-CSCF 118B," and "the P-CSCF 118C") of a P-CSCF Bank 120 to allow the UE 106 to find a P-CSCF to allow the commencement of a Session Initial Protocol signaling between UE 106 and the selected P-CSCF 118 to start the voice/video call. The identity of the selected P-CSCF 118 is stored in the SMF 112 as an IP address or a Fully Qualified Domain Name (FQDN). The SMF 112 will transmit to the UE 106 the IP address of the selected P-CSCF 118 or will resolve the FQDN via a Domain Name Server to determine the IP address of the selected P-CSCF 118 if the address is stored as an FQDN.

However, if the selected P-CSCF 118 is not functional, in conventional systems, the SMF 112 may still send the IP address of the selected P-CSCF 118 as the SMF 112 only knows the identity of the selected P-CSCF 118, not its operational status. Thus, if the selected P-CSCF 118 is not functional, when the UE 106 attempts to initiate SIP signaling with the selected P-CSCF 118 through a User Plane Function (UPF) 122, the SIP signaling will eventually fail. Depending on the configuration of the cellular network 102, the process may take some time to notify the UE 106 that the SIP signaling failed, as the cellular network 102 may provide for repeated attempts to establish communication between the UE 106 and the selected P-CSCF 118.

To reduce the aforementioned issue, and other issues not specifically mentioned herein, the NRF 114 provides P-CSCF availability and loading to the SMF 112. In some examples, the P-CSCFs 118A, 118B, and 118C are configured to register periodically with the NRF 114. The NRF 114 may be configured to periodically transmit P-CSCF 118 availability and/or loading information to the SMF 112. The registration can include the operational status of the P-CSCFs 118A, 118B, and 118C. In some examples, the NRF 114 can be configured to query, using an update availability request, the P-CSCFs 118A, 118B, and 118C at predetermined rates to maintain a current P-CSCF status of P-CSCFs in the P-CSCF Bank 120. In some examples, the NRF 114 can be configured to periodically provide the PCSCF 118 information to the SMF 112. In other examples, the SMF 112 may be configured to periodically query the NRF 114 for P-CSCF 118 availability and/or loading information. In other examples, the P-CSCFs 118A, 118B, and 118C are configured to register with the NRF 114 at predetermined rates to maintain a current P-CSCF status of P-CSCFs in the P-CSCF Bank 120. Thus, when the SMF 112 is tasked with providing the IP address of a P-CSCF to be transmitted to the UE 106, the SMF 112 accesses the NRF 114 and receives from the NRF 114 the particular P-CSCF to use.

Further, the registration of the P-CSCFs can include a current loading of the P-CSCF. The NRF 114 and/or the SMF 112 may use the registered loading of the P-CSCF to determine which P-CSCF to use for the current request. This may help with load sharing between the P-CSCFs 118A, 118B, and 118C. In some examples, the NRF 114 can be configured to query, using an update loading request, the P-CSCFs 118A, 118B, and 118C at predetermined rates to maintain a current P-CSCF load status. In other examples, the P-CSCFs 118A, 118B, and 118C may be configured to register with the NRF 114 at predetermined rates to maintain a current P-CSCF load status.

Figure 2:
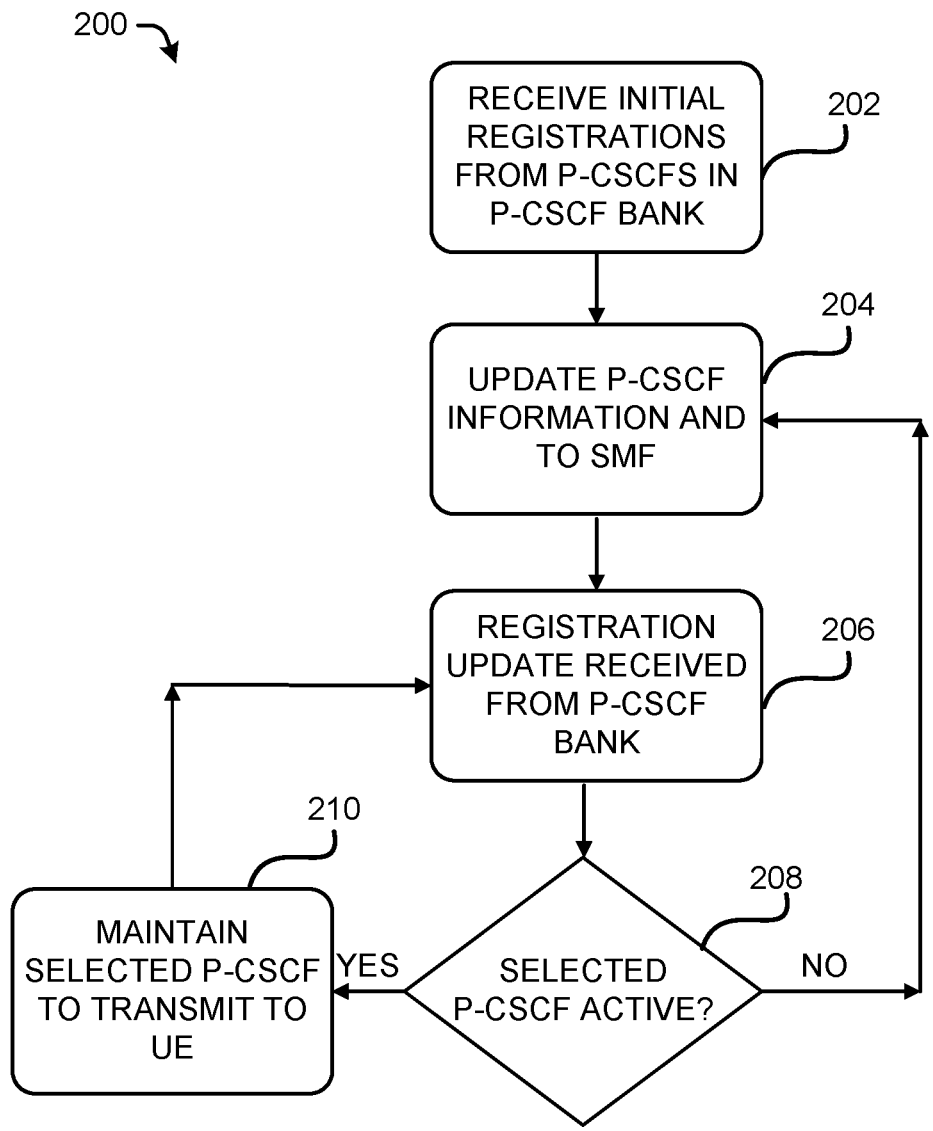
FIG. 2 is an illustrative process for P-CSCF registration and selection, in accordance with some examples of the present disclosure.

FIG. 2 is an illustrative process 200 for P-CSCF registration and selection, in accordance with some examples of the present disclosure. The process 200 and other processes described herein are illustrated as example flow graphs, each operation of which may represent a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

The process 200 commences at operation 202, where the NRF 114 receives initial registrations from the P-CSCFs 118A, 118B, and 118C in the P-CSCF Bank 120. The P-CSCFs 118A, 118B, and 118C associated with the P-CSCF Bank 120 may be associated based on various factors, including the geographical region in which the P-CSCFs 118A, 118B, and 118C are located with respect to the UE 106. In some examples, to reduce lag, it may be preferable to associate P-CSCFs with the UE 106 that are in the same geographical area or region. The operation 202 establishes the initial set of selectable P-CSCFs available that can be selected by the SMF 112, and in some examples, other network functions like the NRF 114. As described above, and as will be provided in more detail below, the SMF 112 may select a particular P-CSCF based on various factors.

The process 200 continues to operation 204, where the NRF 114 updates the P-CSCF 118 information and transmits that information to the SMF 112, the information of which may include the IP address of the registered P-CSCFs 118 that register with the NRF 114. For example, the SMF 112 may receive in an N11 connection a notice that the UE 106 is attempting to setup a voice/video call and requests the initiation of SIP signaling. The SMF 112 will transmit the IP address of a selected P-CSCF 118 for transmission to the UE 106.

The process 200 continues to operation 206, where the registration updates of the P-CSCFs 118A, 118B, and 118C are received at the NRF 114. The updating of the P-CSCF 118 information may be accomplished in various ways and for various reasons. For example, the NRF 114 may periodically query the P-CSCFs 118A, 118B, and 118C to determine their operational status. In another example, the P-CSCFs 118A, 118B, and 118C may be configured to provide to the NRF an updated status, with or without prompting by the NRF 114.

The process 200 continues to operation 208, where the SMF 112 determines if the previously selected P-CSCF 118 is still active based on the received (or not received) registration update from the P-CSCFs 118A, 118B, and 118C. For example, at operation 204, the selected P-CSCF may be the P-CSCF 118A. If at operation 206 a registration update is not received by the NRF 114 for the P-CSCF 118A, the SMF 112 may determine that the P-CSCF is not active (or functional). In some examples, if the NRF 114 does not receive a registration update for the selected P-CSCF 118, or another P-CSCF that previously provided a registration but was not the selected P-CSCF 118, the NRF 114 may be configured to query the P-CSCF from which an updated registration was not received. If the query goes unanswered with an updated registration, the NRF 114, in this configuration, may determine that the P-CSCF from which an updated registration was not received is not active.

If at operation 208 it is determined that the selected P-CSCF is still active, the process 200 continues to operation 210, where the currently selected P-CSCF is maintained as the selected P-CSCF by the SMF 112. The process then continues to operation 206, where the next registrations are received. If at operation 208 it is determined that the selected P-CSCF is not active, the process 200 continues to operation 204, where the IP address of a new P-CSCF is selected for transmission to the UE 106.

Figure 3:
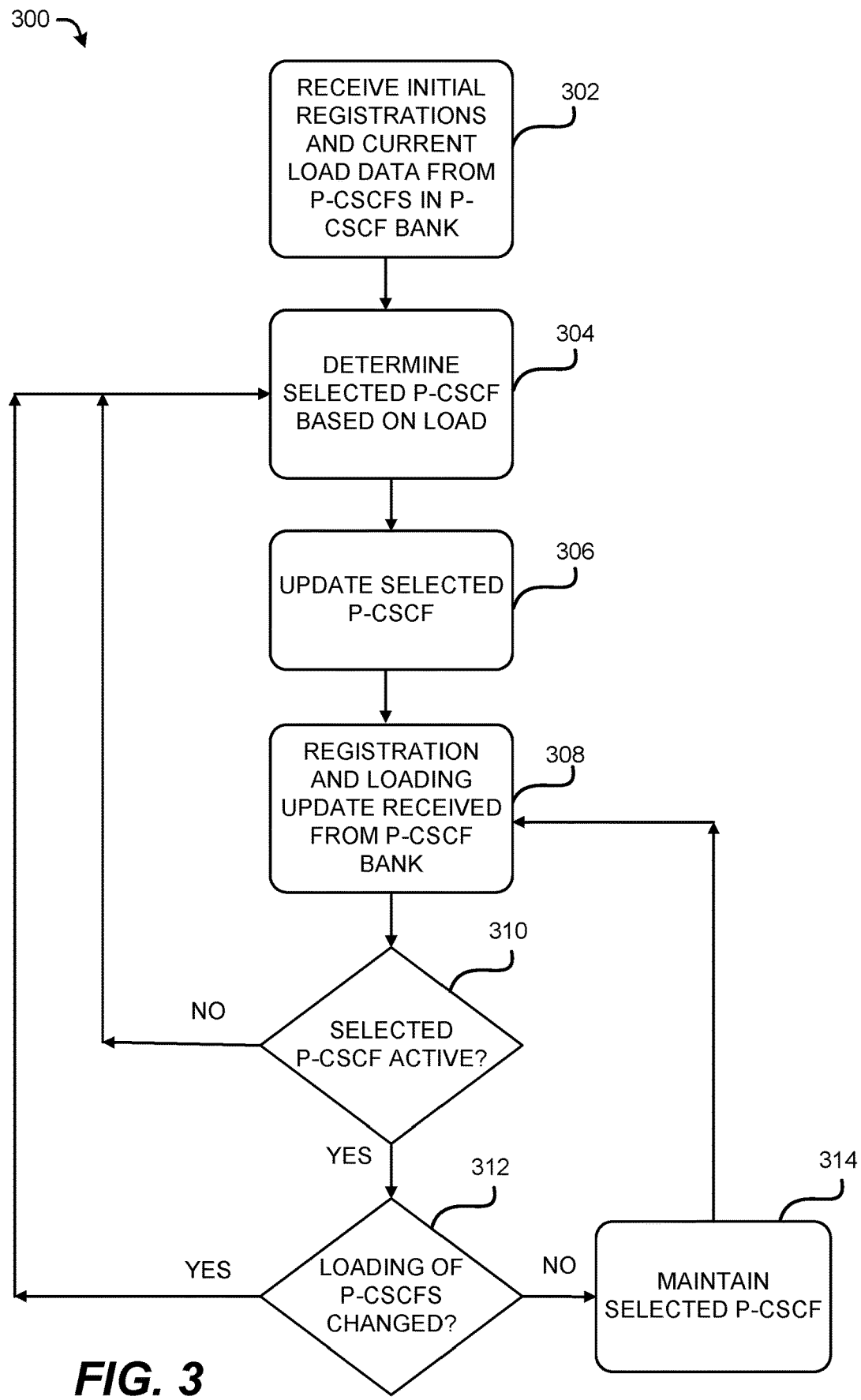
FIG. 3 is an illustrative process for P-CSCF registration and selection in which the SMF performs load balancing, in accordance with some examples of the present disclosure.

FIG. 3 is an illustrative process 300 for P-CSCF registration and selection in which the SMF 112 performs load balancing, in accordance with some examples of the present disclosure. As noted above, other network functions may perform the load balancing function, including, but not limited to, the NRF 114.

The process 300 commences at operation 302, where the NRF 114 receives initial registration and loading data from the P-CSCFs 118A, 118B, and 118C in the P-CSCF Bank 120. The P-CSCFs 118A, 118B, and 118C associated with the P-CSCF Bank 120 may be associated based on various factors, including the geographical region in which the P-CSCFs 118A, 118B, and 118C are located with respect to the UE 106. In some examples, to reduce lag, it may be preferable to associate P-CSCFs with the UE 106 that are in the same geographical area or region as the UE 106. The operation 302 establishes the initial set of selectable P-CSCFs available that can be selected by the SMF 112. The NRF 114 transmits this information to the SMF 112.

The process 300 continues to operation 304, where a determination of which P-CSCF is to be the selected P-CSCF is made. The determination is based on the availability and loading of the P-CSCFs 118A, 118B, and 118C in the P-CSCF Bank 120. As described above, it may be worthwhile to attempt to reduce the probability of overloading a particular P-CSCF. Load balancing, whereby the computational load placed on two or more P-CSCFs is maintained at particular levels with respect to each other, can help increase response times and minimize the effect of a P-CSCF going offline. For example, if a P-CSCF that goes offline (or faults) is handling 90% of a network's P-CSCF functionality, the effect is greater than if the P-CSCF is handling only 5% of the network's P-CSCF functionality.

The process 300 continues to operation 306, where the NRF 114 provides to the SMF 112 updates of the P-CSCFs. The IP address of the selected P-CSCF 118 is transmitted by the SMF 112 to the UE 106. For example, the SMF 112 may receive in the N11 connection a notice that the UE 106 is attempting to setup a voice/video call and requests the initiation of SIP signaling. The SMF 112 will use the P-CSCF 118 information provided by the NRF 114 to select the IP address of which P-CSCF to transmit to be used to handle the SIP signaling.

The process 300 continues to operation 308, where the registration and load data updates of the P-CSCFs 118A, 118B, and 118C are received at the NRF 114 and then transmitted to the SMF 112. The updating of the selected P-CSCF 118 through the receipt of status and loading information may be accomplished in various ways and for various reasons. For example, the NRF 114 may periodically query the P-CSCFs 118A, 118B, and 118C to determine their operational status and load. In another example, the P-CSCFs 118A, 118B, and 118C may be configured to provide to the NRF 114 an updated status and loading (i.e. load data), with or without prompting by the NRF 114.

The process 300 continues to operation 310, where the SMF 112 uses the information provided by the NRF 114 to determine if the previously selected P-CSCF 118 is still active based on the received (or not received) registration update from the P-CSCFs 118A, 118B, and 118C at operation 308. For example, at operation 304, the selected P-CSCF may be the P-CSCF 118A. If at operation 308 a registration update is not received by the NRF 114 for the P-CSCF 118A, the SMF 112 may determine that the P-CSCF is not active (or functional). In some examples, if the NRF 114 does not receive a registration update for the selected P-CSCF 118, or another P-CSCF that previously provided a registration but was not the selected P-CSCF 118, the NRF 114 may be configured to query the P-CSCF from which an updated registration was not received. If the query goes unanswered with an updated registration, the SMF 112, in this configuration, may determine that the P-CSCF from which an updated registration was not received is not active.

If at operation 310 the SMF 112 determines the selected P-CSCF 118 is not active, the process 300 continues to operation 304 where the determination is made for a new P-CSCF to be selected.

If at operation 310 the SMF 112 determines the selected P-CSCF 118 is active, the process 300 continues to operation 312, where the SMF 112 determines if loadings of the P-CSCFs 118 have changed. In some examples, the SMF 112 may determine that the loading of the P-CSCF 118C, a non-selected P-CSCF, has changed to a predetermined threshold. For example, the P-CSCF 118C loading may have changed from a 50% loading to a 3% loading. If the threshold is 10%, the SMF 112 may be instructed to select the P-CSCF 118C even if the currently selected P-CSCF 118 is not above a predetermined threshold. In another example, if the loading of the currently selected P-CSCF 118 increases above a predetermined threshold, such as 80%, the SMF 112 may select another P-CSCF 118 as the selected P-CSCF 118 to reduce the probability of further loading the currently selected P-CSCF 118.

If the loadings of the P-CSCFs 118 have not changed above or below a predetermined threshold, the process 300 continues to operation 314, where the currently selected P-CSCF 118 is maintained as the selected P-CSCF 118. If the loadings of the P-CSCF 118 have changed above or below a predetermined threshold, the process 300 continues to operation 304 where the determination is made for a new P-CSCF to be selected.

Figure 4:
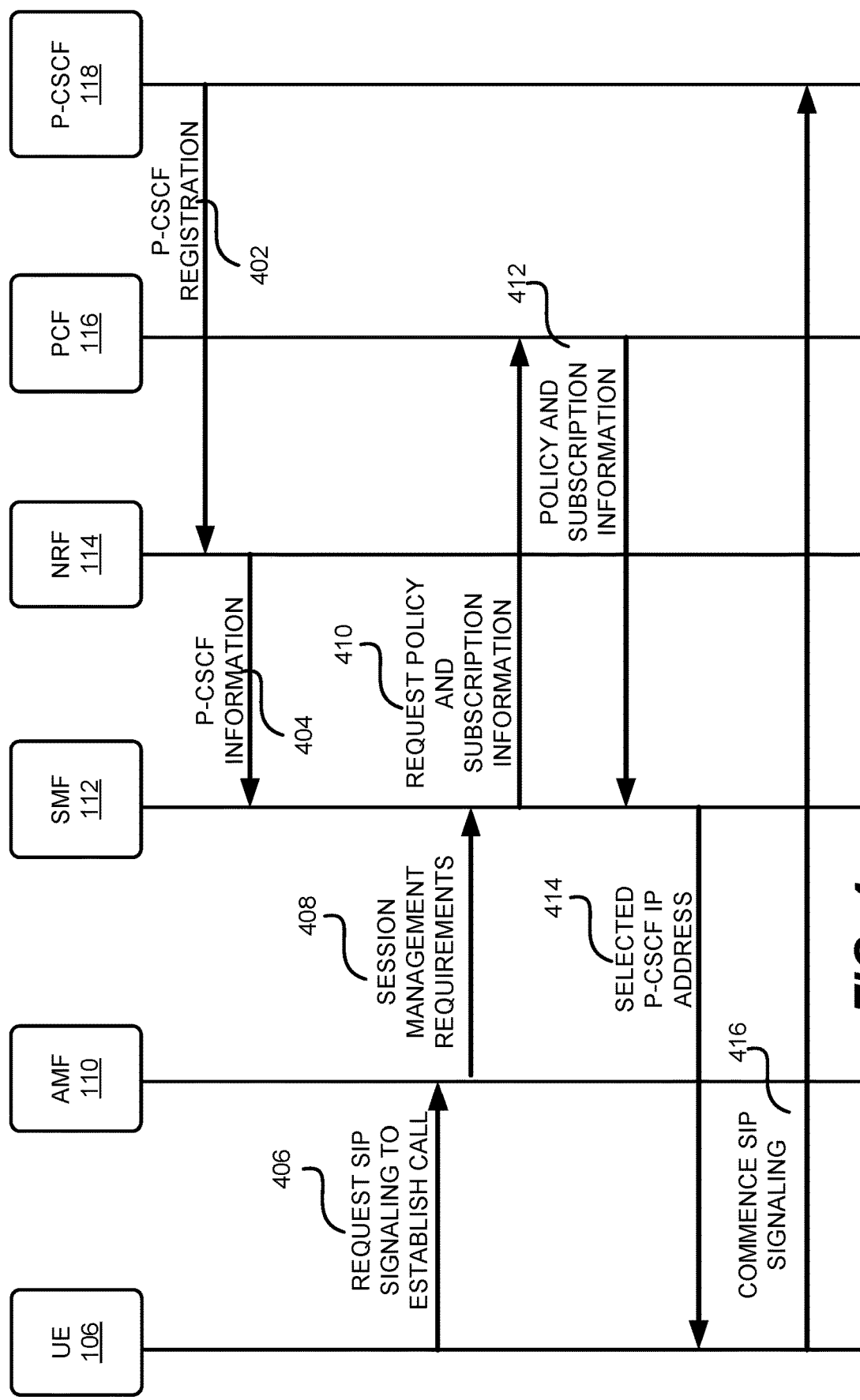
FIG. 4 is an example signal flow diagram for P-CSCF registration and selection, in accordance with some examples of the present disclosure.

FIG. 4 is an example signal flow diagram for P-CSCF registration and selection, in accordance with some examples of the present disclosure. At 402, the P-CSCFs 118 of the P-CSCF Bank 120 perform a registration with the NRF 114. In accordance with various examples provided herein, the NRF 114 selects one of the P-CSCFs as the selected P-CSCF to be transmitted to the SMF 112.

At 404, the NRF 114 transmits to the SMF 112 the availability and loading of the P-CSCFs 118 that registered with the NRF 114 at 402. The SMF 112 uses this information to select the P-CSCF 118 to use for an incoming request for SIP signaling. The SMF 112 transmits to the UE 106 the IP address of the selected P-CSCF 118 or resolves the FQDN via a Domain Name Server to determine the IP address of the selected P-CSCF 118 if the address is stored as an FQDN and then sends the resolved IP address of the selected P-CSCF 118.

At 406, the AMF 110 receives a request from the UE 106 over the N1/N2 connection with the base station 104 to initiate a new session between the UE 106 and a target UE (not illustrated).

At 408, the AMF 110 forwards session management requirements over an N11 connection to the SMF 112.

At 410, over an N7 connection, the SMF 112 retrieves policy and subscription information, using information provided by the NRF 114, from the PCF 116.

At 412, the PCF 116 provides the policy and subscription information to the SMF 112.

At 414, the SMF 112 provides the IP address of the selected P-CSCF 118 to the UE 106.

At 416, the UE 106 contacts the P-CSCF 118 to commence SIP signaling to establish a voice/video call.

Figure 5:
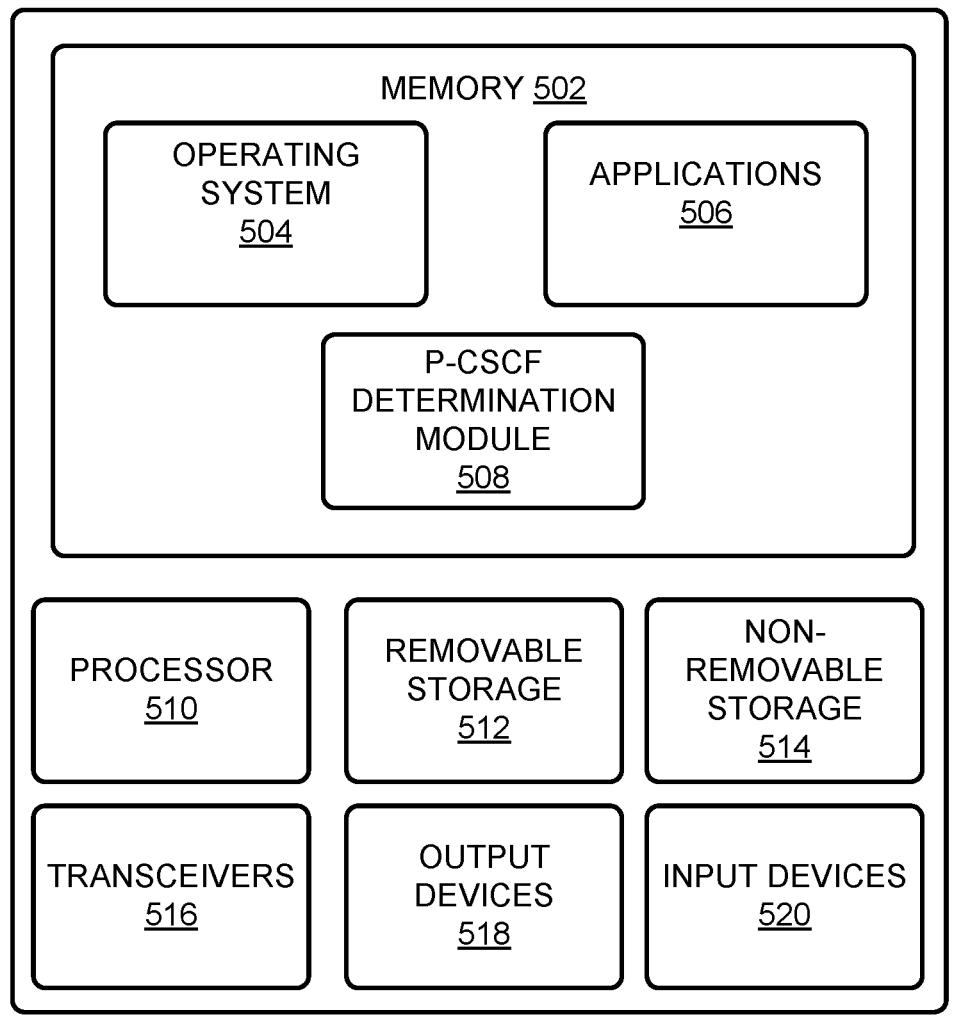
FIG. 5 depicts a component level view of a server computer that provides the Session Management Function according to the systems and methods described herein.

FIG. 5 depicts a component level view of a server computer 500 that provides the Session Management Function according to the systems and methods described herein. The server computer 500 could be any device or combination of devices capable of providing the functionality associated with the systems and methods described herein. The server computer 500 can comprise several components, modules, software functions, or computing devices to execute the above-mentioned functions. The server computer 500 may be comprised of hardware, software, or various combinations thereof. As discussed below, the server computer 500 can comprise memory 502 including an operating system (OS) 504 and one or more standard applications 506. The standard applications 506 may include applications that provide for communication with the cellular network 102 and the UE 106. The OS 504 varies depending on the manufacturer of the server computer 500. The OS 504 contains the modules and software that support basic functions of the server computer 500, such as scheduling tasks, executing applications, and controlling peripherals. In some examples, the OS 504 can enable a P-CSCF determination module 508 used by the server computer 500 to determine a selected P-CSCF 118, and provide other functions, as described above, via transceiver(s) 516. The OS 504 can also enable the server computer 500 to send and retrieve other data and perform other functions.

The server computer 500 can also comprise one or more processors 510 and one or more of removable storage 512, non-removable storage 514, transceiver(s) 516, output device(s) 518, and input device(s) 520. In various implementations, the memory 502 can be volatile (such as random access memory (RAM)), non-volatile (such as read only memory (ROM), flash memory, etc.), or some combination of the two.

In some implementations, the processor(s) 510 can be one or more central processing units (CPUs), graphics processing units (GPUs), both CPU and GPU, or any other combinations and numbers of processing units. The server computer 500 may also include additional data storage devices (removable and/or non-removable) such as, for example, magnetic disks, optical disks, or tape. Such additional storage is illustrated in FIG. 4 by removable storage 512 and non-removable storage 514.

Non-transitory computer-readable media may include volatile and nonvolatile, removable and non-removable tangible, physical media implemented in technology for storage of information, such as computer readable instructions, data structures, program modules, or other data. The memory 502, removable storage 512, and non-removable storage 514 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the server computer 500. Any such non-transitory computer-readable media may be part of the server computer 500 or may be a separate database, databank, remote server, or cloud-based server.

In some implementations, the transceiver(s) 516 include any transceivers known in the art. In some examples, the transceiver(s) 516 can include wireless modem(s) to facilitate wireless connectivity with other components (e.g., between the server computer 500 and a wireless modem that is a gateway to the Internet), the Internet, and/or an intranet. Specifically, the transceiver(s) 516 can include one or more transceivers that can enable the server computer 500 to send and receive data using the cellular network 102. Thus, the transceiver(s) 516 can include multiple single-channel transceivers or a multi-frequency, multi-channel transceiver to enable the server computer 500 to send and receive video calls, audio calls, messaging, etc. The transceiver(s) 516 can enable the server computer 500 to connect to multiple networks including, but not limited to 2G, 3G, 4G, 5G, and Wi-Fi networks. The transceiver(s) can also include one or more transceivers to enable the server computer 500 to connect to future (e.g., 6G) networks, Internet-of-Things (IoT), machine-to machine (M2M), and other current and future networks.

The transceiver(s) 516 may also include one or more radio transceivers that perform the function of transmitting and receiving radio frequency communications via an antenna (e.g., Wi-Fi or Bluetooth®). In other examples, the transceiver(s) 516 may include wired communication components, such as a wired modem or Ethernet port, for communicating via one or more wired networks. The transceiver(s) 516 can enable the server computer 500 to facilitate audio and video calls, download files, access web applications, and provide other communications associated with the systems and methods, described above.

In some implementations, the output device(s) 518 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 518 can also include speakers, or similar devices, to play sounds or ringtones when an audio call or video call is received. Output device(s) 518 can also include ports for one or more peripheral devices, such as headphones, peripheral speakers, or a peripheral display.

In various implementations, input device(s) 520 include any input devices known in the art. For example, the input device(s) 520 may include a camera, a microphone, or a keyboard/keypad. The input device(s) 520 can include a touch-sensitive display or a keyboard to enable users to enter data and make requests and receive responses via web applications (e.g., in a web browser), make audio and video calls, and use the standard applications 506, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 520 and an output device 518.

The presently disclosed examples are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method, comprising:
registering, at a Network Repository Function (NRF), a plurality of Proxy-Call Session Control Functions (P-CSCFs) of a cellular network to generate fifth generation (5G) network P-CSCF information, the 5G network P-CSCF information including a list of available P-CSCFs and 5G network P-CSCF status information, the 5G network P-CSCF status information being associated with at least one of the P-CSCFs, the 5G network P-CSCF status information indicating to the NRF whether there is at least one of i) a 5G network P-CSCF load status being above a predetermined 5G network P-CSCF load status, or ii) a 5G network P-CSCF load status error being identified for the at least one of the P-CSCFs;
transmitting, from the NRF, an update loading request communication to the plurality of P-CSCFs to update a loading of the plurality of P-CSCFs to update the list of available P-CSCFs;
determining, at the NRF and based at least on the 5G network P-CSCF status information, that there is an error with a load status of the at least one of the P-CSCFs;
updating, at the NRF, the list of available P-CSCFs based at least on the error with the load status of the at least one of the P-CSCFs;
transmitting, from the NRF to a Session Management Function (SMF), the 5G network P-CSCF information;
selecting, at the SMF, a P-CSCF out of the list of available P-CSCFs to be a selected P-CSCF;
receiving a request from a user equipment (UE) to initiate a Session Initiation Protocol (SIP); and
transmitting, from the SMF, an Internet Protocol (IP) address of the selected P-CSCF to initiate the SIP to allow the UE to make a voice or video call.

2. The method of claim 1, further comprising querying, by the NRF, for a usage level of the plurality of P-CSCFs in the list of available P-CSCFs.

3. The method of claim 2, further comprising transmitting, from the NRF to the SMF, the usage level of the plurality of P-CSCFs in the list of available P-CSCFs.

4. The method of claim 3, wherein selecting the selected P-CSCF further comprises using a particular loading of the plurality of P-CSCFs in the list of available P-CSCFs.

5. The method of claim 1, further comprising transmitting, from the NRF, an update availability request communication to the plurality of P-CSCFs to update an availability of the plurality of P-CSCFs to update the list of available P-CSCFs.

6. The method of claim 1, wherein the 5G network P-CSCF status information indicates whether there is i) the 5G network P-CSCF load status being above the predetermined 5G network P-CSCF load status, and ii) the 5G network P-CSCF load status error being identified for the at least one of the P-CSCFs.

7. The method of claim 1, further comprising:
determining that the SIP failed to commence based on a failure of the one of the plurality of P-CSCFs; and
transmitting, from the SMF, a second IP address of a second P-CSCF of the plurality of P-CSCFs in the list of available P-CSCFs to initiate the SIP.

8. A non-transitory computer-readable storage medium having computer-executable instructions stored thereupon that, when executed by a computer, cause the computer to perform acts comprising:
registering, at a Network Repository Function (NRF), a plurality of Proxy-Call Session Control Functions (P-CSCFs) of a cellular network to generate and fifth generation (5G) network P-CSCF information, the P-CSCF information including a list of available P-CSCFs and 5G network P-CSCF status information, the 5G network P-CSCF status information being associated with at least one of the P-CSCFs, the 5G network P-CSCF status information indicating whether there is at least one of i) a 5G network P-CSCF load status being above a predetermined 5G network P-CSCF load status, or ii) a 5G network P-CSCF load status error being identified for the at least one of the P-CSCFs;
transmitting, from the NRF to a Session Management Function (SMF), the 5G network P-CSCF information;
selecting, at the SMF, a P-CSCF out of the list of available P-CSCFs to be a selected P-CSCF;
receiving a request from a user equipment (UE) to initiate a Session Initiation Protocol (SIP); and
transmitting, from the SMF, an Internet Protocol (IP) address of the selected P-CSCF to initiate the SIP to allow the UE to make a voice or video call; and
transmitting, from the NRF, an update loading request communication to the plurality of P-CSCFs to update a loading of the plurality of P-CSCFs to update the list of available P-CSCFs.

9. The non-transitory computer-readable storage medium of claim 8, further comprising computer-executable instructions that, when executed by the computer, cause the computer to perform the act comprising querying, by the NRF, for a usage level of the plurality of P-CSCFs in the list of available P-CSCFs.

10. The non-transitory computer-readable storage medium of claim 8, further comprising computer-executable instructions that, when executed by the computer, cause the computer to perform the act comprising transmitting, from the NRF to the SMF, a usage level of the plurality of P-CSCFs in the list of available P-CSCFs.

11. The non-transitory computer-readable storage medium of claim 10, further comprising computer-executable instructions that, when executed by the computer, cause the computer to perform the act comprising:
selecting the selected P-CSCF based on a particular loading of the selected P-CSCF.

12. The non-transitory computer-readable storage medium of claim 8, further comprising computer-executable instructions that, when executed by the computer, cause the computer to perform the act comprising transmitting, from the NRF, an update availability request communication to the plurality of P-CSCFs to update an availability of the plurality of P-CSCFs to update the list of available P-CSCFs.

13. The non-transitory computer-readable storage medium of claim 8, wherein the 5G network P-CSCF status information indicates whether there is i) the 5G network P-CSCF load status being above the predetermined 5G network P-CSCF load status, and ii) the 5G network P-CSCF load status error being identified for the at least one of the P-CSCFs.

14. A Session Management Function (SMF) server comprising:
a memory storing computer-executable instructions; and
a processor in communication with the memory, the computer-executable instructions causing the processor to perform acts comprising:
receiving, from a Network Repository Function (NRF), fifth generation (5G) network Proxy-Call Session Control Function (P-CSCF) information associated with at least one of a plurality of P-CSCFs of a cellular network, the 5G network P-CSCF information including a list of available P-CSCFs and 5G network P-CSCF status information, the 5G network P-CSCF status information indicating whether there is at least one of i) a 5G network P-CSCF load status being above a predetermined 5G network P-CSCF load status, or ii) a 5G network P-CSCF load status error being identified for the at least one of the plurality of P-CSCFs;
selecting a P-CSCF out of the list of available P-CSCFs as a selected P-CSCF;
receiving, from a user equipment a request to initiate a Session Initiation Protocol; and
transmitting, to the user equipment, the selected P-CSCF; and
receiving, from the NRF, un updated status of the plurality of P-CSCFs to generate an updated list of available P-CSCFs.

15. The SMF server of claim 14, further comprising computer-executable instructions for receiving a particular loading of the at least one of the plurality of P-CSCFs.

16. The SMF server of claim 15, further comprising computer-executable instructions for selecting the P-CSCF based on the particular loading of the at least one of the plurality of P-CSCFs.

17. The SMF server of claim 15, further comprising computer-executable instructions for replacing the selected P-CSCF with a second P-CSCF based on the particular loading of the at least one of the plurality of P-CSCFs.

18. The SMF server of claim 14, further comprising computer-executable instructions for:
determining that the selected P-CSCF is not active; and
replacing the selected P-CSCF with a second P-CSCF of the plurality of P-CSCFs.

19. The SMF server of claim 14, further comprising computer-executable instructions for:
receiving a particular loading status of the selected P-CSCF;
determine that the particular loading status of the selected P-CSCF is above a predetermined threshold; and
perform loading balancing by selecting a second P-CSCF of the plurality of P-CSCFs to replace the selected P-CSCF.

20. The SMF server of claim 14, wherein the 5G network P-CSCF status information indicates whether there is i) the 5G network P-CSCF load status being above the predetermined 5G network P-CSCF load status, and ii) the 5G network P-CSCF load status error being identified for the at least one of the plurality of P-CSCFs.

* * * * *